(12) United States Patent
Bardman et al.

(10) Patent No.: US 11,161,986 B2
(45) Date of Patent: Nov. 2, 2021

(54) PREPARATION OF A COATINGS FORMULATION WITH ALKALI SWELLABLE POLYMER PARTICLES

(71) Applicants: Dow Global Technologies LLC, Midland, MI (US); Rohm and Haas Company, Collegeville, PA (US)

(72) Inventors: James K. Bardman, Green Lane, PA (US); Jonathan DeRocher, Coopersburg, PA (US); Andrew Hejl, Lansdale, PA (US); Anthony K. VanDyk, Collegeville, PA (US); Lin Wang, Furlong, PA (US); Kimy Yeung, Phoenixville, PA (US)

(73) Assignees: Rohm and Haas Company, Collegeville, PA (US); Dow Global Technologies, LLC, Midland, MI (US)

(*) Notice: Subject to any disclaimer, the term of this patent is extended or adjusted under 35 U.S.C. 154(b) by 166 days.

(21) Appl. No.: 16/497,475

(22) PCT Filed: Feb. 26, 2018

(86) PCT No.: PCT/US2018/019663
§ 371 (c)(1),
(2) Date: Sep. 25, 2019

(87) PCT Pub. No.: WO2018/182892
PCT Pub. Date: Oct. 4, 2018

(65) Prior Publication Data
US 2021/0108089 A1  Apr. 15, 2021

Related U.S. Application Data

(60) Provisional application No. 62/477,000, filed on Mar. 27, 2017.

(51) Int. Cl.
| | | |
|---|---|---|
| C09D 7/65 | (2018.01) | |
| C09D 5/02 | (2006.01) | |
| C09D 7/43 | (2018.01) | |
| C09D 7/40 | (2018.01) | |
| C08J 3/00 | (2006.01) | |
| C08J 3/21 | (2006.01) | |
| C08L 33/08 | (2006.01) | |
| C09D 133/08 | (2006.01) | |
| C09D 151/00 | (2006.01) | |

(52) U.S. Cl.
CPC ............... *C09D 5/024* (2013.01); *C08J 3/005* (2013.01); *C08J 3/21* (2013.01); *C08L 33/08* (2013.01); *C09D 7/43* (2018.01); *C09D 7/65* (2018.01); *C09D 7/70* (2018.01); *C09D 133/08* (2013.01); *C09D 151/003* (2013.01); *C08J 2333/08* (2013.01); *C08J 2433/08* (2013.01)

(58) Field of Classification Search
CPC . C09D 5/024; C09D 7/65; C09D 7/43; C09D 7/70; C09D 133/08; C09D 151/03; C08J 3/005; C08J 3/21; C08J 2333/08; C08J 2433/08; C08J 3/205; C08L 33/08; C08F 265/06
USPC ........................................................ 523/201
See application file for complete search history.

(56) References Cited

U.S. PATENT DOCUMENTS

| | | | |
|---|---|---|---|
| 4,468,498 A | 8/1984 | Kowalski et al. | |
| 5,326,843 A | 7/1994 | Lorah et al. | |
| 7,217,762 B1* | 5/2007 | Jorgedal | C08F 257/02 524/800 |
| 8,686,096 B2* | 4/2014 | Deetz | C08F 2/22 526/81 |
| 9,340,685 B2 | 5/2016 | Carchidi et al. | |
| 2020/0102412 A1* | 4/2020 | Bardman | C09D 151/003 |
| 2020/0299527 A1* | 9/2020 | Bardman | C08F 2/22 |

FOREIGN PATENT DOCUMENTS

| | | |
|---|---|---|
| EP | 1911881 A1 | 1/2019 |
| WO | 2007009161 A1 | 1/2007 |

* cited by examiner

*Primary Examiner* — Hannah J Pak
(74) *Attorney, Agent, or Firm* — Reid S. Willis

(57) ABSTRACT

The present invention relates to a process comprising the step of contacting an aqueous dispersion of swelled polymer particles with a rheology modifier and a binder to form a coatings composition with a VOC of less than 50 g/L. The swelled polymer particles arise from neutralization of alkali swellable polymer particles having a high acid core content and a low $T_g$ shell. The composition arising from the process of the present invention is useful for improving open time, especially for low VOC coatings applications.

10 Claims, No Drawings

PREPARATION OF A COATINGS FORMULATION WITH ALKALI SWELLABLE POLYMER PARTICLES

BACKGROUND OF THE INVENTION

The present invention relates to a process for preparing a coatings formulation with an aqueous dispersion of alkali swellable polymer particles. The dispersion of alkali swellable polymer particles is useful as an open time additive in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a process comprising the steps of a) contacting an aqueous dispersion of alkali swellable polymer particles with a base to form an aqueous dispersion of swelled polymer particles; and b) contacting the aqueous dispersion of swelled polymer particles with a rheology modifier and a binder to form a coatings composition with a VOC of less than 50 g/L; wherein the alkali swellable polymer particles comprise a shell having a $T_g$ of not greater than 25° C. and an acid functionalized core; wherein the core-to-shell ratio is in the range of −1:3.2 to −1:6; and wherein coatings composition comprises 1 to 20% by weight of swelled polymer particles based on the weight of total solids in the coatings composition.

In a second aspect, the present invention is a process comprising the step of contacting an aqueous dispersion of swelled polymer particles with a rheology modifier and a binder to form a coatings composition with a VOC of less than 50 g/L, wherein the swelled polymer particles have a core-shell morphology, wherein the shell has a $T_g$ of not greater than 25° C. and the core comprises water and a salt of a carboxylic acid; and wherein the coatings composition comprises from 1 to 20% by weight of the swelled polymer particles based on the total solids in the coatings composition.

The coatings composition arising from the process of the present invention has a significantly higher open time than comparable formulations that do not contain the alkali swelled particles.

DETAILED DESCRIPTION OF THE INVENTION

In a first aspect, the present invention is a process comprising the steps of a) contacting an aqueous dispersion of alkali swellable polymer particles with a base to form an aqueous dispersion of swelled polymer particles; and b) contacting the aqueous dispersion of swelled polymer particles with a rheology modifier and a binder to form a coatings composition with a VOC of less than 50 g/L; wherein the alkali swellable polymer particles comprise a shell having a $T_g$ of not greater than 25° C. and an acid functionalized core; wherein the core-to-shell ratio is in the range of −1:3.2 to −1:6; and wherein coatings composition comprises 1 to 20% by weight of swelled polymer particles based on the weight of total solids in the coatings composition.

The alkali swellable polymer particles are characterized by an acid functionalized $P^r$ stage portion (the core), preferably a carboxylic acid functionalized core, and a second stage portion (the shell) having a $T_g$ as calculated by the Fox equation of not greater than 25° C. The words "core" and "shell" are used herein as a convenience to describe the first and final stages of the polymerization process (or first and second stages if the polymer particles are generated in two stages). Accordingly, the final alkali swellable polymer particles may, but need not have a core-shell morphology. The alkali swellable polymer particles may be prepared by any of a number of techniques, including those well known in the art. (See U.S. Pat. Nos. 4,468,498; 5,326,843; and 9,340,685). For example, the core may be produced by a single stage or a multistage process, preferably in the presence of a chain transfer agent such as n-dodecyl mercaptan or mercaptoethanol. The core may also be prepared from a seed process. The core is then used in making the alkali swellable polymer particles in one or more additional stages.

Preferably, the core comprises from 30, more preferably from 35, and most preferably from 38 weight percent, to preferably 50, more preferably to 45, and most preferably to 42 weight percent structural units of a carboxylic acid monomer, based on the weight of the core. As used herein, the term "structural units" refers to the remnant of the recited monomer after polymerization. For example, a structural unit of methacrylic acid is as illustrated:

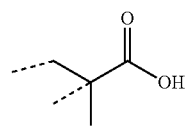

structural unit of methacrylic acid

The acid functionalized core also preferably comprises from 50, more preferably from 55, and most preferably from 58 weight percent, to preferably 70, more preferably to 65, and most preferably to 62 weight percent structural units of a nonionic ethylenically unsaturated monomer.

Examples of carboxylic acid functionalized monomers include methacrylic acid, acrylic acid, and itaconic acid, with acrylic acid and methacrylic acid being preferred. Examples of nonionic ethylenically unsaturated monomers include one or more $C_1$-$C_{10}$ alkyl acrylates and methacrylates such as methyl methacrylate, ethyl acrylate, ethyl methacrylate, butyl acrylate, butyl methacrylate, and 2-ethylhexyl acrylate; and styrene. Methyl methacrylate and butyl methacrylate are preferred nonionic ethylenically unsaturated monomers.

The core may also comprise structural units of a polyethylenically unsaturated monomer such as ethylene glycol di(meth)acrylate, allyl (meth)acrylate, 1,3-butane-diol di(meth)acrylate, diethylene glycol di(-meth)acrylate, trimethylol propane trimethacrylate, or divinyl benzene. The structural units of the polyethylenically unsaturated monomer, if present, are preferably in the range of from 0.1, more preferably from 0.3 weight percent to 10, more preferably to 3 weight percent, based on the weight of the core.

Prior to contact with the base, the core preferably has an average diameter in the range of from 100 nm, more preferably from 120 nm, most preferably from 150 nm, to preferably 500 nm, more preferably to 400 nm, and most preferably to 350 nm, as measured by a BI-90 Plus Brookhaven Particle Analyzer.

The shell more preferably has a $T_g$ of not greater than 20° C., and most preferably not greater than 15° C. Preferably the shell comprises structural units of one or more monomers having a $T_g$ of >50° C. (that is, one or more high $T_g$ monomers) such as methyl methacrylate ($T_g$=105° C.) or styrene ($T_g$=100° C.) or a combination thereof, and structural units of at least one monomer having a $T_g$ of less than 10° C. (that is, one or more one low $T_g$ monomers) such as ethyl acrylate ($T_g$=−23° C.), butyl acrylate ($T_g$=−53° C.), or 2-ethylhexyl acrylate ($T_g$=−52° C.) or combinations thereof. The shell preferably further comprises structural units of an acid monomer, preferably a carboxylic acid monomer, preferably methacrylic acid ($T_g$=228° C.) or acrylic acid ($T_g$=101° C.). (The recited $T_g$s refer to those of the corresponding homopolymers as reported by Polymer Properties Database© 2015.)

Preferably, the concentration of structural units of the high $T_g$ monomer in the shell, preferably methyl methacrylate or styrene, more preferably methyl methacrylate, is in the range of from 40, more preferably from 42, and most preferably from 44 weight percent, to preferably 60, more preferably to 55, more preferably to 50, and most preferably to 48 weight percent, based on the weight of the shell.

Preferably the concentration of structural units of the low $T_g$ monomer in the shell is in the range of from 38, more preferably from 45, more preferably from 48 weight percent, and most preferably from 50 weight percent, to preferably 59, more preferably to 57, and most preferably to 54 weight percent, based on the weight of the shell. The low $T_g$ monomer is preferably butyl acrylate.

Preferably, the concentration of structural units of the carboxylic acid monomer in the shell is in the range of from 0.2, more preferably from 0.5 weight percent, to preferably 5, more preferably to 3, and most preferably to 2 weight percent, based on the weight of the shell.

Preferably, the average diameter of the alkali swellable polymer particles prior to contact with the base are in the range of from 150 nm, more preferably from 250 nm and most preferably 350 nm, preferably to 900 nm, more preferably to 750 nm, and most preferably to 550 nm.

Preferably, the concentration of the alkali swellable polymer particles prior to base addition is in the range of from 10, and more preferably from 15 weight percent, to 35, and more preferably to 30 weight percent based on the weight of water and the alkali swellable polymer particles. Similarly, the concentration of swelled polymer particles after base addition is, or is adjusted to be in the range of from 10, more preferably from 15 weight percent, to 35, more preferably to 30 weight percent based on the weight of water and the alkali swellable polymer particles. The viscosity of the dispersion of alkali swellable polymer particles prior to base addition is in the range of 10-100 mPa·s. The base increases the pH of the core, thereby neutralizing and swelling it. The base may be a volatile base such as ammonia, trimethylamine, triethylamine, or methylisopropylamine, or a non-volatile base such as 2-amino-2-methyl-1-propanol (commercially available as AMP 95 neutralizing agent), n-butyldiethanolamine (commercially available as Vantex T neutralizing agent), LiOH, NaOH, or KOH. As used herein, a non-volatile base refers to a base having a boiling point of greater than 150° C.

The base is contacted with the alkali swellable polymer particles to produce swelled polymer particles preferably having a viscosity at least 50 mPa·s higher, more preferably at least 100 mPa·s higher, and most preferably at least 200 mPa·s higher than the alkali swellable particles. The concentration of base is sufficient to neutralize the core of the alkali swellable polymer particles. As used herein, "neutralized" means that the pH of the core is raised to a pH that is at least 1.5 units higher than the $pK_a$ of the acid monomer used to make the acid functionalized core. For example, if methacrylic acid ($pK_a$=4.65) is used to make the acid functionalized core, the pH of the alkali swellable dispersion is adjusted to at least 6.15, preferably to at least 6.5, more preferably to at least 7, and most preferably to at least 8. Preferably the amount of base added is at least 50% stoichiometric, more preferably, at least stoichiometric, and most preferably greater than stoichiometric with respect to the acid content of alkali swellable polymer particles.

Preferably, the base is contacted with the alkali swellable polymer particles at a temperature in the range of from 15° C., more preferably from 20° C., to 60° C., more preferably to 50° C., most preferably to 40° C. Preferably, the viscosity of the swelled polymer particles is in the range of from 100 mPa·s, more preferably from 200 mPa·s, to 1500 mPa·s. Preferably, at least 90%, more preferably at least 95%, and most preferably at least 99% of the final viscosity is attained in less than 1 hour beyond completion of base addition.

After the aqueous dispersion of swelled polymer particles is combined with the dispersion of binder and rheology modifier, the consequent formulation preferably exhibits a change of viscosity of less than 1000 mPa·s, more preferably less than 500 mPa·s, and most preferably less 200 mPa·s. The swelled polymer particles, therefore, do not serve as thickening agents in the process of the present invention because most, if not all, of the swelling of polymer particles (and concomitant thickening of the dispersion) has taken place prior to combining the swelled polymer particles with the other components that make up the coatings formulation.

As used herein, the term binder refers to an aqueous dispersion of polymer particles that exhibit less than a 10-nm increase in particle size when exposed to base. These polymer particles (binder solids) preferably have an average diameter in the range of from 70 nm, more preferably from 100 nm to 600 nm, more preferably to 500 nm as determined by a Brookhaven BI-90 Plus Particle Analyzer. The binder solids are also characterized by comprising less than 5 weight percent, preferably less than 4 weight percent, and most preferably less than 3 weight percent structural units of an acid monomer, based on the weight of the binder solids.

The binder is advantageously prepared by aqueous emulsion polymerization of one or more ethylenically unsaturated monomers, examples of which include styrene, vinyl acetate, acrylamide, methacrylamide, acrylonitrile, and Ci-Cio-alkyl esters of acrylic acid or methacrylic acid including methyl methacrylate, ethyl methacrylate, ethyl acrylate, butyl acrylate, 2-propylheptyl acrylate, and 2-ethylhexyl acrylate.

As used herein, the term rheology modifier refers to water soluble or water dispersible associative rheology modifiers such as hydrophobically modified ethylene oxide urethane polymers (HEURs), hydrophobically modified alkali swellable emulsions (HASEs), and styrene-maleic anhydride terpolymers (SMATs), as well as non-associative rheology modifiers such as alkali swellable emulsions (ASEs).

The concentration of polymer particles associated with the binder (binder solids) in the coatings formulation is preferably in the range of from 5, more preferably from 10, to preferably 40, more preferably to 30 weight percent, based on the weight of solids in the coatings composition. The concentration of swelled polymer particles is in the range of from 1, preferably from 2, and more preferably from 5 weight percent, to 20, preferably to 15, and more preferably to 10 weight percent, based on the weight of solids in the coatings composition.

The concentration of the rheology modifier is in the range of from 0.5 to 5 weight percent, based on the weight of solids in the coatings composition. The aqueous dispersion of swelled polymer particles, the binder, and the rheology modifier may be combined in any order.

The composition prepared by the process of the present invention may further advantageously include any or all of the following components: dispersants, pigments, defoamers, surfactants, solvents, extenders, coalescents, biocides, opaque polymers, and colorants. The composition is a low volatile organic content (VOC) composition having less than 50 g/L of VOCs.

Examples

Preparation of an Alkali Swellable Polymer
A. Preparation of 1$s^r$ Stage (Core)

A first stage (core, 60 MMA/40 MAA) was prepared as follows: A 5-L, four-necked round bottom flask (kettle) was equipped with a paddle stirrer, thermometer, N2 inlet, and reflux condenser. Deionized water (1760 g), was added to the kettle and heated to 86° C. under N2. A monomer emulsion (ME1) was prepared by mixing deionized water (720 g), sodium dodecyl benzene sulfonate (SDS, 5.2 g, 23% active), methyl methacrylate (780.0 g), and methacrylic acid (10.0 g). A portion of ME1 (164.0 g) was removed and placed aside in a separate container. To the remaining ME1 was added SDS (50.0 g, 23% active) and methacrylic acid (510.0 g). When the kettle temperature reached 86° C. a mixture of deionized water (160.0 g) and SDS (5.0 g, 23% active) was added to the kettle, followed by the addition of the ME1 initially removed and set aside. A mixture of sodium persulfate (5.5 g) in deionized water (40.0 g) was then added to the kettle. The temperature of the kettle dropped to –76° C., then was allowed to rise to 85° C. during a 15-min hold period. The remaining ME1 was then fed to the kettle over 2 h at 85° C. After completion of the ME1 feed, the dispersion was held at 85° C. for 15 min, whereupon the dispersion was cooled to 25° C. and filtered to remove any coagulum. The filtered dispersion had a pH of 2.9, a solids content of 31.7% and an average particle size of 152 nm.

B. Preparation of a Dispersion of Alkali Swellable Polymer Particles with a 1:5 Core-To-Shell Ratio and 40% Methacrylic Acid in the Core To a 5-L, four-necked round bottom flask (kettle) was equipped with a paddle stirrer, thermometer, N2 inlet, and reflux condenser was added DI water (500 g) and heated to 86° C. under N2. A monomer emulsion (ME2) was prepared by mixing DI water 193 g, SDS (14.3 g, 23% active), butyl acrylate (655.2 g), methyl methacrylate (585.9 g), and methacrylic acid (18.9 g). When the kettle temperature reached 86° C., the dispersion of part A (795.0 g) was added to the kettle and the temperature adjusted to 60° C. A 0.1% solution of iron (II) sulfate in water (20 g) was then added to the kettle along with a solution of isoascorbic acid (0.6 g) mixed with DI water (45 g). Co-feed solutions of sodium persulfate (3.8 g) in DI water (90 g) and sodium bisulfite (2.5 g) in DI water (90 g) were added at a rate of 0.7 g/min to the kettle. Three minutes after the initiation of co-feed solution addition, the ME2 was added at a rate of 2 g/min. Ten minutes after initiation of the ME2 addition, the feed rate was increased to 4 g/m. After another ten minutes, the ME2 feed rate was increased to 8 g/min. After another ten minutes, the ME feed rate was increased to 16 g/min. The temperature of the kettle was kept at 59-61° C. throughout the addition of ME2. After completion of the addition of ME2, the co-feeds were overfed for another twenty minutes. After the completion of co-feed addition, the contents of the kettle was cooled to room temperature and filtered to remove any coagulum. The filtered dispersion had a pH of 2.1, a solids content of 47.5% and an average particle size of 275 nm as measured by a BI-90 Plus Brookhaven Particle Analyzer.

The alkali swellable polymer was swelled in three separate experiments with three different bases: NH4OH, 2-amino-2-methyl-1-propanol, and NaOH as follows: Neutralizing base was added to the polymer dispersion to prepare a dispersion with a final solids content of 25%. The neutralizing base was added at room temperature with mechanical mixing over 10 min. The pH after one hour of completion of addition was measured to be >7. Paint formulations were prepared by adding the dispersion of swelled particles to a paint formulation described in Table 1.

TABLE 1

| Paint Formulation with Open Time Additive | | |
|---|---|---|
| Material Name | Pounds | Gallons |
| RHOPLEX™ HG-706 Binder | 525.7 | 59.37 |
| BYK-024 Defoamer | 1.0 | 0.1 |
| Propylene Glycol | 4.3 | 0.5 |
| TRITON™ X-100 Surfactant | 4.4 | 0.5 |
| Water | 16.7 | 2.0 |
| KATHON™ LX 1.5% Biocide | 1.5 | 0.2 |
| TAMOL™ 2002 Dispersant | 2.0 | 0.2 |
| Ammonia (28%) | 1.0 | 0.1 |
| Ti-Pure R-746 TiO2 | 285.0 | 14.7 |
| Water | 20.0 | 2.4 |
| TEXANOL Coalescent | 7.9 | 1.0 |
| ACRYSOL™ RM-2020E Rheology Modifier | 20.0 | 2.3 |
| ACRYSOL™ RM-725 Rheology Modifier | 3.0 | 0.4 |
| BYK-024 Defoamer | 2.0 | 0.2 |
| Swelled Particles (25% solids) | 95.5 | 11.4 |
| Water | 38.7 | 4.63 |
| Totals | 1030 | 100 |

RHOPLEX, TRITON, KATHON, TAMOL, and ACRYSOL are all Trademarks of The Dow Chemical Company or its Affiliates.

Paint samples were formulated using an overhead mixer. Rheology modifier and water amounts were adjusted to target a Stormer viscosity of 95 KU and an ICI viscosity of 1.3. Samples were equilibrated overnight before being evaluated for open time.

Open time was measured in accordance with ASTM-D7488. The test was performed in a constant temperature/humidity room (72° F., 50% RH). Paint was deposited on a black vinyl scrub chart using a drawdown bar with a 5-mil gap. The film was immediately scored by making parallel marks in the wet paint using two wooden applicators. Sections of the film were then brushed at timed intervals using a primed 1" nylon brush. The film was allowed to dry overnight. A panel of at least three readers visually inspected the panel and recorded the last cross brush section that showed no sign of the score marks as the open time. The measured open time for the samples neutralized by NH4OH, NaOH, and 2-amino-2-methyl-1-propanol was 9 min for each coating, as compared to 6 min for a coating prepared from the identical paint formulation but without the open time additive.

The invention claimed is:

1. A process for preparing a coatings composition comprising the steps of a) contacting an aqueous dispersion of alkali swellable polymer particles with a base to form an aqueous dispersion of swelled polymer particles; and b) contacting the aqueous dispersion of swelled polymer particles with a rheology modifier and a binder to form a coatings composition with a VOC of less than 50 g/L; wherein the alkali swellable polymer particles comprise a shell having a $T_g$ of not greater than 25° C. and an acid functionalized core; wherein the core-to-shell ratio is in the range of 1:3.2 to 1:6; and wherein the coatings composition comprises 2 to 20 percent by weight of swelled polymer particles based on the weight of total solids in the coatings composition.

2. The process of claim 1 wherein the aqueous dispersion of alkali swellable polymer particles has a solids content in the range of from 10 to 35 weight percent, based on the weight of the aqueous dispersion of alkali swellable polymer particles.

3. The process of claim 2 wherein the viscosity of the dispersion of alkali swellable polymer particles prior to base addition is in the range of 10-100 mPa·s, and the aqueous dispersion of swelled polymer particles has a viscosity that is at least 50 mPa·s higher than the alkali swellable polymer particles.

4. The process of claim 1 wherein the acid functionalized core of the alkali swellable polymer particles comprises from 30 to 50 weight percent structural units of a carboxylic acid monomer, and from 50 to 70 weight percent structural units of a nonionic ethylenically unsaturated monomer, based on the weight of the core; and wherein the shell of the alkali swellable polymer particles has a $T_g$ of not greater than 20° C. and comprises structural units of a monomer having a $T_g$ of greater than 50° C., structural units of a monomer having a $T_g$ of less than 10° C., and structural units of an acid monomer.

5. The process of claim 4 wherein the acid functionalized core of the alkali swellable polymer particles comprises from 35 to 45 weight percent structural units of methacrylic acid or acrylic acid, based on the weight of the core; and from 55 to 65 weight percent structural units of the nonionic ethylenically unsaturated monomer, wherein the nonionic ethylenically unsaturated monomer is methyl methacrylate or butyl methacrylate; wherein the shell comprises from 40 to 60 weight percent structural units of the monomer having a $T_g$ of greater than 50° C., wherein the monomer having a $T_g$ of greater than 50° C. includes styrene or methyl methacrylate; from 38 to 59 weight percent structural units of the monomer having a $T_g$ of less than 10° C., wherein the monomer having a $T_g$ of less than 10° C. is butyl acrylate; and from 0.2 to 5 weight percent structural units of the acid monomer, wherein the acid monomer is methacrylic acid or acrylic acid; and wherein the average diameter of the alkali swellable polymer particles is in the range of from 150 nm to 900 nm.

6. The process of claim 5 wherein the base is a nonvolatile base, wherein the aqueous dispersion of the swelled polymer particles has a viscosity at least 100 mPa·s higher than the aqueous dispersion of alkali swellable particles, and wherein the base is contacted with the alkali swellable polymer particles at a temperature in the range of from 15° C. to 60° C.

7. The process of claim 6 wherein the base is LiOH, NaOH, or KOH; wherein the base is contacted with the alkali swellable polymer particles at a temperature in the range of from 20° C. to 40° C.; wherein the viscosity of the swelled polymer particles is in the range of from 200 mPa·s to 1500 mPa·s, and wherein the coating composition exhibits a change of viscosity of less than 500 mPa·s after the aqueous dispersion of swelled polymer particles is contacted with the binder and the rheology modifier.

8. The process of claim 1 wherein the concentration of swelled polymer particles is in the range of from 5 to 15 weight percent, based on the weight of solids in the coatings composition; the concentration of binder solids is in the range of from 5 to 40 weight percent, based on the weight of solids in the coatings composition; and the concentration of rheology modifier is in the range of from 0.5 to 5 weight percent, based on the weight of solids in the coatings composition.

9. The process of claim 8 wherein the coatings composition further includes at least one component selected from the group consisting of dispersants, pigments, defoamers, surfactants, solvents, extenders, coalescents, biocides, opaque polymers, and colorants.

10. A process for preparing a coatings composition comprising the step of contacting an aqueous dispersion of swelled polymer particles with a rheology modifier and a binder to form a coatings composition with a VOC of less than 50 g/L, wherein the swelled polymer particles have a core-shell morphology, wherein the shell has a $T_g$ of not greater than 25° C. and the core comprises water and a salt of a carboxylic acid; and wherein the coatings composition comprises from 1 to 20% by weight of the swelled polymer particles based on the total solids in the coatings composition.

* * * * *